US012776022B2

(12) United States Patent
Bistritzer et al.

(10) Patent No.: US 12,776,022 B2
(45) Date of Patent: Oct. 27, 2026

(54) OPTIMIZATION OF A METROLOGY ALGORITHM FOR EXAMINATION OF SEMICONDUCTOR SPECIMENS

(71) Applicant: Applied Materials Israel Ltd., Rehovot (IL)

(72) Inventors: Rafael Bistritzer, Petach Tikva (IL); Ilan Ben-Harush, Tel-Aviv (IL); Mor Baram, Nes-Ziona (IL); Tal Ben-Shlomo, Givatayim (IL); Nir Billfeld (Levi), Kiryat Ata (IL); Noam Teomim, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 682 days.

(21) Appl. No.: 18/214,231

(22) Filed: Jun. 26, 2023

(65) Prior Publication Data

US 2024/0428395 A1 Dec. 26, 2024

(51) Int. Cl.
*G06T 7/00* (2017.01)
*G06T 7/60* (2017.01)

(52) U.S. Cl.
CPC ............ *G06T 7/0006* (2013.01); *G06T 7/001* (2013.01); *G06T 7/60* (2013.01); *G06T 2207/20016* (2013.01); *G06T 2207/30148* (2013.01)

(58) Field of Classification Search
USPC ........................................ 716/53, 54, 55, 110
See application file for complete search history.

(56) References Cited

U.S. PATENT DOCUMENTS

2019/0041266 A1* 2/2019 Wang ................. G01N 21/8851
2019/0080447 A1* 3/2019 Shkalim ................ G06T 7/0006
2019/0257767 A1* 8/2019 Shaubi ............... G01N 21/9501
2022/0301196 A1* 9/2022 Uliel ..................... G06T 7/0004

* cited by examiner

*Primary Examiner* — Brian Ngo
(74) *Attorney, Agent, or Firm* — Lowenstein Sandler LLP

(57) ABSTRACT

There is provided a metrology system and method. The method includes obtaining a set of tool parameters selected from multiple tool parameters characterizing the examination tool, varying a value of each tool parameter from the set a number of times, giving rise to a plurality of tool settings corresponding to a plurality of combinations of varying values of the set of tool parameters, configuring an examination tool with each given tool setting of the plurality of tool settings; and in response to receiving, from the examination tool, a plurality of sets of images corresponding to the plurality of tool settings and representing expected tool variations over time in a single tool or between different tools, optimizing a metrology algorithm using the plurality of sets of images so as to meet at least one metrology metric including tool matching.

20 Claims, 5 Drawing Sheets

OPTIMIZATION OF A METROLOGY ALGORITHM FOR EXAMINATION OF SEMICONDUCTOR SPECIMENS

TECHNICAL FIELD

The presently disclosed subject matter relates, in general, to the field of examination of a semiconductor specimen, and more specifically, to metrology recipe optimization for the examination of a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally, or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected and provide useful information on adjustments that may be needed to the manufacturing tools, equipment, and/or compositions, depending on the type of defects identified.

SUMMARY

In accordance with certain aspects of the presently disclosed subject matter, there is provided a computerized metrology system, the system comprising an examination tool operatively connected to a processing circuitry, wherein the processing circuitry is configured to obtain a set of tool parameters selected from multiple tool parameters characterizing the examination tool, vary a value of each tool parameter from the set a number of times, giving rise to a plurality of tool settings corresponding to a plurality of combinations of varying values of the set of tool parameters, and configure the examination tool with each given tool setting of the plurality of tool settings; and the examination tool is configured to, in response to being configured with each given tool setting, acquire a set of images capturing at least one site on the specimen with the given tool setting, thereby obtaining a plurality of sets of images corresponding to the plurality of tool settings and representing expected tool variations over time in a single tool or between different tools; and wherein the processing circuitry is further configured to optimize a metrology algorithm using the plurality of sets of images so as to meet at least one metrology metric including tool matching.

In addition to the above features, the system according to this aspect of the presently disclosed subject matter can comprise one or more of features (i) to (ix) listed below, in any desired combination or permutation which is technically possible:

- (i). The metrology algorithm can be optimized with respect to a set of algorithm parameters selected from multiple algorithm parameters characterizing the metrology algorithm.
- (ii). The processing circuitry can be further configured to optimize the metrology algorithm by varying a value of each algorithm parameter from the set a number of times, giving rise to a plurality of algorithm settings corresponding to a plurality of combinations of varying values of the set of algorithm parameters; for each given algorithm setting, obtaining a plurality of sets of measurement data corresponding to the plurality of sets of images using the metrology algorithm configured with the given algorithm setting, and evaluating the plurality of sets of measurement data with respect to the at least one metrology metric; and optimizing the metrology algorithm based on the evaluation.
- (iii). The evaluating can comprise, for each given algorithm setting, computing an individual value of an individual target function based on each set of measurement data and an overall value of an overall target function based on the plurality of sets of measurement data; selecting, from the plurality of algorithm settings, an algorithm setting having the best overall value meeting a spec of the at least one metrology metric; and verifying the individual value of each set of measurement data in the plurality of sets of measurement data obtained under the selected algorithm setting with respect to the spec of the at least one metrology metric, to determine whether further evaluation is needed.
- (iv). The verifying can comprise, in response to the individual value of each set of measurement data meeting the spec, identifying one or more tool settings which result in one or more sets of measurement data having relatively poor performance with respect to the spec; selecting one or more new tool settings with finer resolution from a tool setting range characterized by the one or more tool settings, and acquiring one or more new sets of images under the one or more new tool settings; and obtaining one or more sets of measurement data corresponding to the one or more new sets of images using the metrology algorithm configured with the selected algorithm setting, and evaluating the one or more new sets of measurement data with respect to the at least one metrology metric.
- (v). The verifying can comprise, in response to at least some of the plurality of sets of measurement data having an individual value not meeting the spec, selecting one or more new algorithm parameters to add to the set of algorithm parameters, or tightening the tolerance of tool parameter variations.

(vi). The processing circuitry can be configured to acquire the set of images for each given tool setting by, for a given site of the at least one site, alternately acquiring a first sequence of frames and a second sequence of frames, wherein the first sequence of frames is acquired at a tool setting with an optimal condition of the set of algorithm parameters, and the second sequence of frames is acquired at the given tool setting; and combining respectively the first sequence of frames to a first image and the second sequence of frames to a second image, wherein the set of images comprises the first image and the second image for the given site.

(vii). The at least one metrology metric can further comprise one or more of precision, correlation, and sensitivity.

(viii). The set of tool parameters can comprise focus, stigmatism, and numerical apertures.

(ix). The set of algorithm parameters can comprise smoothing and derivative.

In accordance with other aspects of the presently disclosed subject matter, there is provided a computerized metrology method, the method comprising: obtaining a set of tool parameters selected from multiple tool parameters characterizing the examination tool; varying a value of each tool parameter from the set a number of times, giving rise to a plurality of tool settings corresponding to a plurality of combinations of varying values of the set of tool parameters; configuring an examination tool with each given tool setting of the plurality of tool settings; and in response to receiving, from the examination tool, a plurality of sets of images corresponding to the plurality of tool settings and representing expected tool variations over time in a single tool or between different tools, optimizing a metrology algorithm using the plurality of sets of images so as to meet at least one metrology metric including tool matching.

This aspect of the disclosed subject matter can comprise one or more of features (i) to (ix) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a computerized metrology method, the method comprising: obtaining a set of tool parameters selected from multiple tool parameters characterizing the examination tool; varying a value of each tool parameter from the set a number of times, giving rise to a plurality of tool settings corresponding to a plurality of combinations of varying values of the set of tool parameters; configuring an examination tool with each given tool setting of the plurality of tool settings; and in response to receiving, from the examination tool, a plurality of sets of images corresponding to the plurality of tool settings and representing expected tool variations over time in a single tool or between different tools, optimizing a metrology algorithm using the plurality of sets of images so as to meet at least one metrology metric including tool matching.

This aspect of the disclosed subject matter can comprise one or more of features (i) to (ix) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
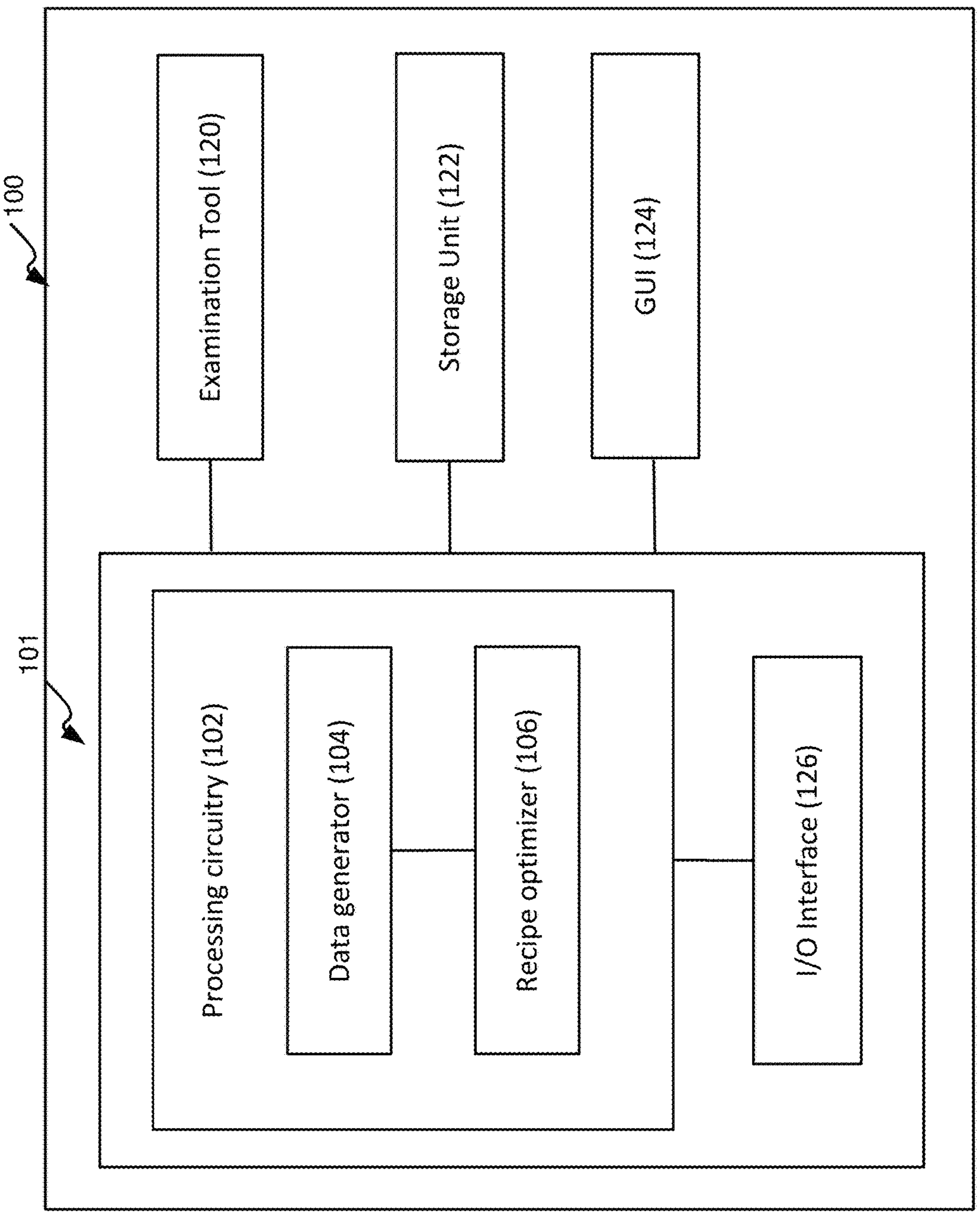
FIG. 1 illustrates a generalized block diagram of an examination system in accordance with certain embodiments of the presently disclosed subject matter.

The process of semiconductor manufacturing often requires multiple sequential processing steps and/or layers, each one of which could possibly cause errors that may lead to yield loss. Examples of various processing steps can include lithography, etching, depositing, planarization, growth (such as, e.g., epitaxial growth), and implantation, etc. Various examination operations, such as defect-related examination, and/or metrology-related examination, can be performed at different processing steps/layers during the manufacturing process to monitor and control the process. The examination operations can be performed a multiplicity of times, for example after certain processing steps, and/or after the manufacturing of certain layers, or the like.

By way of example, metrology operations can be performed on the specimen to measure one or more characteristics of the structural features/elements formed on the specimen, such as, e.g., dimensions (e.g., line widths, line spacing, contacts diameters, size of the element, edge roughness, gray level statistics, etc.), shapes of elements, distances within or between elements, related angles, and overlay information associated with elements corresponding to different design levels, etc. Such measurements can be used to evaluate the performance of the processing step(s) during which the features are fabricated. For instance, if some of the measurements of the specimen are unacceptable (e.g., exceeding a predetermined range or threshold), such measurements may be used to alter one or more parameters of the processing step(s) such that subsequent specimens manufactured by the same processing step(s) can have acceptable characteristics.

Metrology operations are performed by a metrology tool using metrology recipes. A metrology recipe is typically created during a recipe setup phase and comprises one or more metrology algorithms pertaining to different metrology applications. The metrology recipe, upon being created, can be used by a metrology tool for performing metrology operations on a semiconductor specimen during runtime examination.

A metrology algorithm typically comprises a large group of algorithm parameters which are conventionally tuned manually, e.g., by an application engineer. Such manual tuning is limited to a small number of parameters and relies on personal experience and proficiency, thus is normally time-consuming and error prone, even with expert level of application knowledge. In addition, as semiconductor fabrication processes continue to advance, semiconductor devices are developed with increasingly complex structures and shrinking feature dimensions, which requires tighter specs of the metrology metrics, such as precision and matching, to be met. Application engineers face increasing challenges to tune the parameters in order to meet the specs, as well as to ensure a proper balance between the various metrology metrics.

Moreover, in order to tune the parameters for the purpose of meeting the specs, a sufficient image dataset is required for evaluating with respect to the metrology metrics. However, such a dataset is often very difficult to obtain. By way of example, in order to evaluate tool-to-tool matching representative of measurement variance between different tools, images should be acquired by different tools. However, in many cases, there are not always a sufficient number of tools available at the R&D center and/or customer site. Even in cases where there are sufficient tools, such image acquisition requires placing multiple tools offline in the fab, thus causing significant tool-down time and affecting system throughput. In addition, even if the entire fleet of tools is put offline for image acquisition, it is not always guaranteed that the images acquired from the fleet of tools at a given time would necessarily possess the expected variations that are supposed to be observed over time.

Accordingly, certain embodiments of the presently disclosed subject matter propose a system and method for generating a dataset (also termed as a data set, or an image set) usable for optimizing a metrology algorithm, which does not have one or more of the disadvantages described above. The present disclosure proposes to vary a value of each tool parameter from the set of tool parameters a number of times, so as to provide a plurality of tool settings corresponding to a plurality of combinations of varying values of the set of tool parameters, and configure the examination tool with each given tool setting of the plurality of tool settings to acquire a set of images capturing at least one site on the specimen with the given tool setting, thereby obtaining a plurality of sets of images corresponding to the plurality of tool settings and representing expected tool variations over time in a single tool or between different tools. The plurality of sets of images can be used to optimize a metrology algorithm, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification, segmentation, and/or metrology operations, such as, e.g., critical dimension (CD) measurements, roughness, overlay, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying and/or other processes provided with regard to the specimen or parts thereof.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted-directly or via one or more intermediate systems—to system 101. The present disclosure is not limited to any specific type of examination tools and/or the resolution of image data resulting from the examination tools.

In some embodiments, at least one of the examination tools 120 has metrology capabilities and can be configured to capture images and perform metrology operations on the captured images. Such an examination tool is also referred to herein as a metrology tool.

According to certain embodiments, the metrology tool can be an electron beam tool, such as, e.g., scanning electron microscopy (SEM). SEM is a type of electron microscope that produces images of a specimen by scanning the specimen with a focused beam of electrons. The electrons interact with atoms in the specimen, producing various signals that contain information on the surface topography and/or composition of the specimen. SEM is capable of accurately measuring features during the manufacture of semiconductor wafers. By way of example, the metrology tool can be critical dimension scanning electron microscopes (CD-SEM) used to measure critical dimensions of structural features in the images.

According to certain embodiments of the presently disclosed subject matter, the examination system 100 comprises a computer-based system 101 operatively connected to the examination tools 120 and capable of enabling automatic metrology operations with respect to a semiconductor specimen in runtime based on runtime images obtained during specimen fabrication. System 101 is also referred to as a metrology system.

System 101 includes a processing circuitry 102 operatively connected to a hardware-based I/O interface 126 and configured to provide processing necessary for operating the system, as further detailed with reference to FIGS. 2-5 and 7. The processing circuitry 102 can comprise one or more processors (not shown separately) and one or more memories (not shown separately). The one or more processors of the processing circuitry 102 can be configured to, either separately or in any appropriate combination, execute several functional modules in accordance with computer-readable instructions implemented on a non-transitory computer-readable memory comprised in the processing circuitry. Such functional modules are referred to hereinafter as comprised in the processing circuitry.

The one or more processors referred to herein can represent one or more general-purpose processing devices such as a microprocessor, a central processing unit, or the like. More particularly, a given processor may be one of a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM), or Rambus DRAM (RDRAM), etc.

According to certain embodiments of the presently disclosed subject matter, system 101 can be a metrology system configured to generate a dataset usable for optimizing a metrology application. In such cases, one or more functional modules comprised in the processing circuitry 102 of system 101 can include a data generator 104 and a recipe optimizer 106.

Specifically, the data generator 104 can be configured to select a set of tool parameters from multiple tool parameters characterizing the examination tool, vary a value of each tool parameter from the set a number of times, giving rise to a plurality of tool settings corresponding to a plurality of combinations of varying values of the set of tool parameters, and configure the examination tool with each given tool setting of the plurality of tool settings.

In response to being configured with each given tool setting, the examination tool 120 can acquire a set of images capturing at least one site on the specimen with the given tool setting, thereby obtaining a plurality of sets of images corresponding to the plurality of tool settings and representing expected tool variations over time in a single tool or between different tools. The plurality of sets of images forms a dataset usable for algorithm optimization.

The recipe optimizer 106 can be configured to optimize the metrology algorithm using the plurality of sets of images so as to meet at least one metrology metric including tool matching. Upon the recipe/algorithm being optimized, system 101 can be regarded as a metrology system capable of performing runtime metrology operations using the optimized metrology recipe. Details of the process are described below with reference to FIGS. 2-5 and 7.

Operation of systems 100 and 101, the processing circuitry 102, and the functional modules therein will be further detailed with reference to FIGS. 2-5 and 7.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as selecting a set of tool parameters, varying the value of each tool parameter, configuring the examination tool, and optimizing the metrology algorithm, etc., can thus be performed by respective processors (or processor combinations) in the processing circuitry 102, while, optionally, these operations may be performed by the same processor. The present disclosure should not be limited to being construed as one single processor always performing all the operations.

In some cases, additionally to system 101, the examination system 100 can comprise one or more examination modules, such as, e.g., metrology operation module, defect detection module, Automatic Defect Review Module (ADR), Automatic Defect Classification Module (ADC), and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the generated dataset, the optimized metrology algorithm, etc., can be provided to the one or more examination modules for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120. Accordingly, these input data can be retrieved from the storage unit 122 and provided to the processing circuitry 102 for further processing. The output of the system 101, such as, e.g., the generated dataset, and the optimized metrology algorithm, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters. The user may also view the operation results or intermediate processing results, such as, e.g., the acquired image sets, the optimized algorithm parameters, etc., on the GUI.

In some cases, system 101 can be further configured to send, via I/O interface 126, the operation results to the examination tool 120 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1. Each system component and module in FIG. 1 can be made up of any combination of software, hardware and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular components, which are adapted to independently and/or cooperatively operate to process various data and electrical inputs, and for enabling operations related to a computerized examination system. In some cases, multiple instances of a component may be utilized for reasons of performance, redundancy and/or availability. Similarly, in some cases, multiple instances of a component may be utilized for reasons of functionality or application. For example, different portions of the particular functionality may be placed in different instances of the component.

It should be noted that the examination system illustrated in FIG. 1 can be implemented in a distributed computing environment, in which one or more of the aforementioned components and functional modules shown in FIG. 1 can be distributed over several local and/or remote devices. By way of example, the examination tool 120 and the system 101 can be located at the same entity (in some cases hosted by the same device) or distributed over different entities, depending on specific system configurations and implementation needs. In some examples, certain components utilize a cloud implementation, e.g., implemented in a private or public cloud. Communication between the various components of the examination system, in cases where they are not located entirely in one location or in one physical entity, can be realized by any signaling system or communication components, modules, protocols, software languages, and drive signals, and can be wired and/or wireless, as appropriate.

It should be further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-5 and 7. Likewise, the methods described with respect to FIGS. 2-5 and 7 and their possible implementations can be implemented by systems 101 and 100. It is therefore noted that embodiments discussed in relation to the methods described with respect to FIGS. 2-5 and 7 can also be implemented, mutatis mutandis as various embodiments of the systems 101 and 100, and vice versa.

Figure 2:
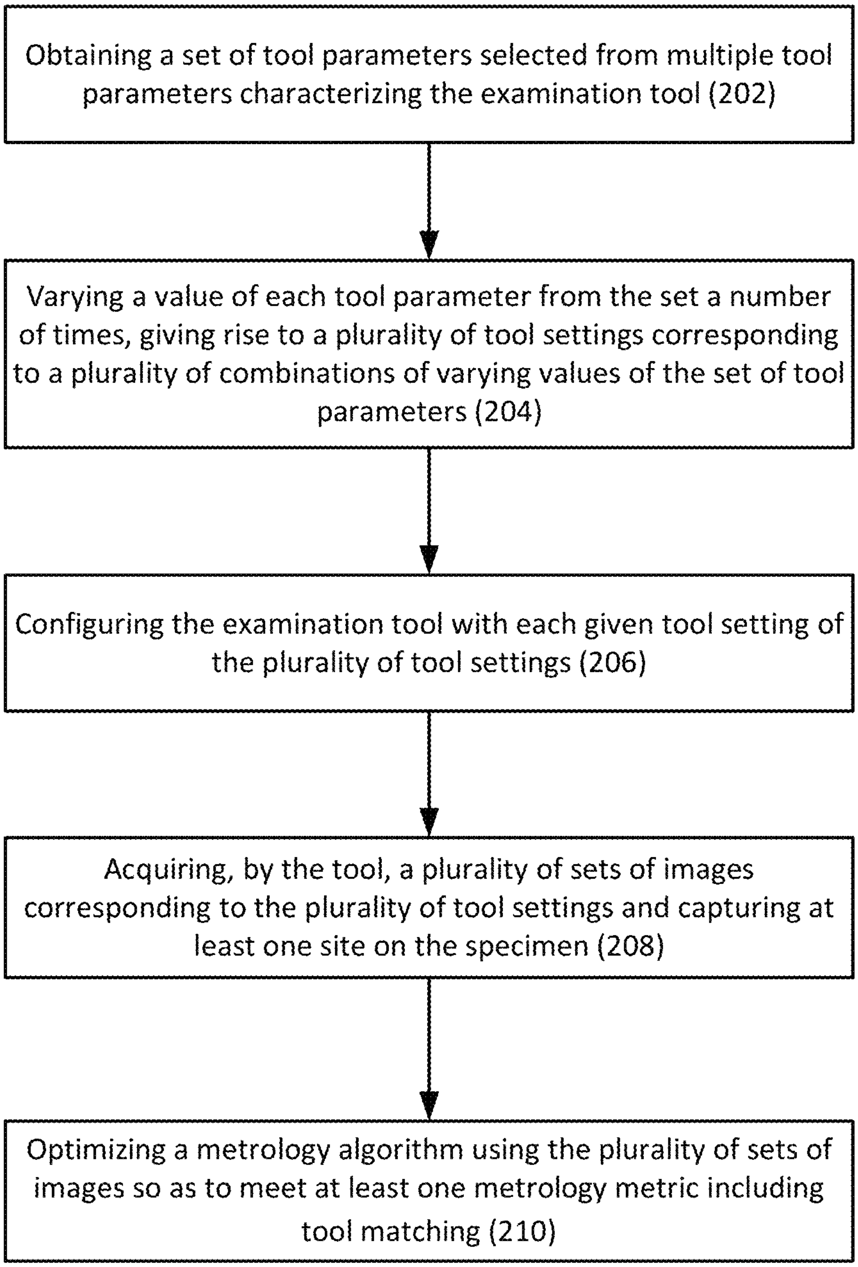
FIG. 2 illustrates a generalized flowchart of data generation in accordance with certain embodiments of the presently disclosed subject matter.

Referring to FIG. 2, there is illustrated a generalized flowchart of data generation in accordance with certain embodiments of the presently disclosed subject matter.

As described above, a semiconductor specimen is typically made of multiple layers. The examination process of a specimen can be performed a multiplicity of times during the fabrication process of the specimen, for example following the processing steps of specific layers. In some cases, a sampled set of processing steps can be selected for in-line examination, based on their known impacts on device characteristics or yield. Images of the specimen or parts thereof can be acquired at the sampled set of processing steps to be examined.

For the purpose of illustration only, certain embodiments of the following description are described with respect to image acquisition for a given processing step/layer of the sampled set of processing steps. Those skilled in the art will readily appreciate that the teachings of the presently disclosed subject matter, such as the process of data generation and recipe optimization, can be performed with respect to any layer and/or processing steps of the specimen. The present disclosure should not be limited to the number of layers comprised in the specimen and/or the specific layer(s) to be examined.

An examination tool is typically configured with multiple tool parameters characterizing the tool, such as, e.g., focus, stigmatism, and numerical apertures (NA), etc. A set of tool parameters can be selected (202) from the multiple tool parameters for the purpose of configuring the tool for image data collection/acquisition. The set of tool parameters can be selected in various ways. For instance, the set of parameters can be predefined, e.g., based on their known physical impacts on measurement variations. By way of example, the parameter of focus can be selected, knowing that after initial calibration, the tool focus will vary over time. In addition, two different tools that are calibrated at the same time still do not share the same focus capability. Alternatively, the set of tool parameters can be selected automatically, based on failure analysis with respect to certain metrology metrics.

The value of each tool parameter from the set of tool parameters can be varied (204) a number of times, giving rise to a plurality of tool settings corresponding to a plurality of combinations of varying values of the set of tool parameters. By way of example, the value of a given parameter, such as focus, can be varied within a predefined range in accordance with an interval or step size. The examination tool (such as the examination tool 120 as illustrated in FIG. 1) can be configured (206) in turn with each given tool setting of the plurality of tool settings.

In response to being configured with each given tool setting, the examination tool can acquire (208) a set of images capturing at least one site on the specimen under the given tool setting. By way of example, a site can refer to a target region containing a target structure (e.g., a structural feature or pattern on a semiconductor specimen) that is of interest to be examined on a specimen. The at least one site can refer to one or more sites on the specimen that contain the same target structure.

Once the tool traverses each tool setting of the plurality of tool settings and captures a respective set of images thereof, a plurality of sets of images corresponding to the plurality of tool settings can be acquired by the tool. The plurality of sets of images forms a dataset representing expected tool variations over time in a single tool or between different tools.

The dataset generated as such can be used to evaluate the metrology metric of matching, as the measurement variance between tools results from tool parameter variations.

Figure 6:
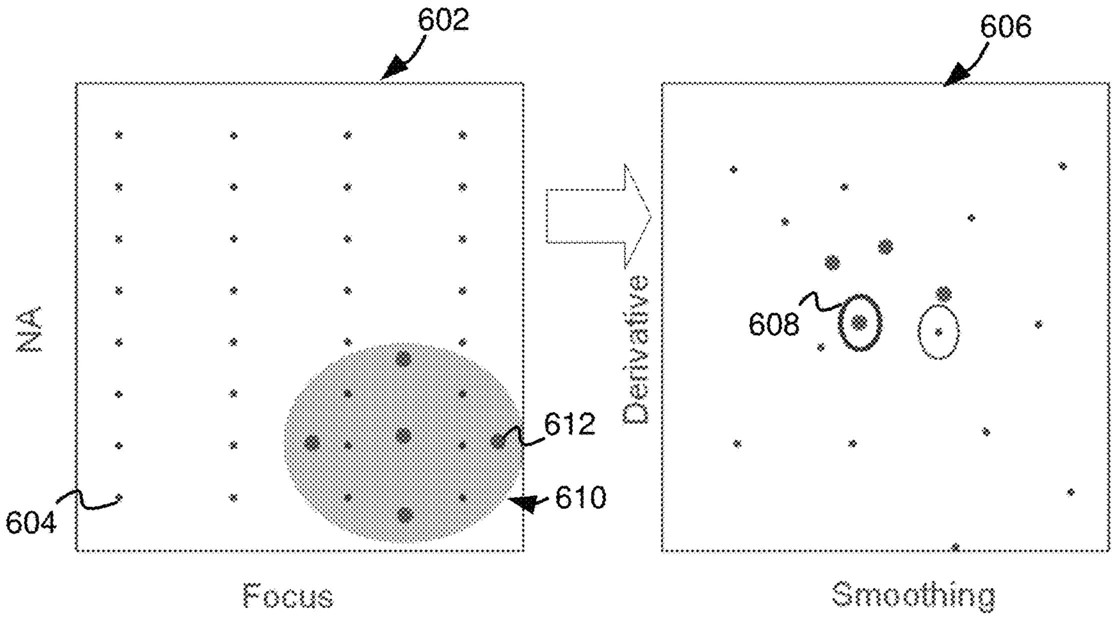
FIG. 6 illustrates schematically the processes of data generation and algorithm optimization in accordance with certain embodiments of the presently disclosed subject matter.

As exemplified in FIG. 6, 602 illustrates a tool parameter space characterized by two tool parameters: focus and numerical apertures (NA), respectively illustrated in the x and y directions. The values of the focus and NA parameters are respectively varied a number of times, giving rise to a plurality of combinations of varying values of the two parameters, represented by the dots in 602. Each dot represents a specific tool setting configured by corresponding focus and NA values. By way of example, the values of the focus parameter can be varied within a focus window in accordance with a step size. The focus window can approximately center around an optimal focus value (e.g., around the center position of the x axis in 602). The focus window represents the expected focus variations/degradations that would occur over time, either in a single tool or between different tools. The NA values can be varied in a similar manner.

For each specific tool setting in 602, such as the tool setting represented by 604, the examination tool can be configured with the setting 604, e.g., by tuning the focus and NA values of the tool to the specific values of the tool setting 604 (e.g., represented by the x, y coordinates). The tool configured as such is used to acquire an image set for one or more sites on the specimen. For instance, m sites on the specimen can be selected, and the tool can acquire n frames consecutively for each site under the specific tool setting 604. The n frames for a given site can be combined to form one higher resolution image for the given site. The image set acquired under tool setting 604 thus comprises m images. Similarly, the plurality of tool settings in 602 can be traversed in turn, and the tool can sequentially capture a plurality of sets of images corresponding to the plurality of tool settings.

In some embodiments, certain physical effects can be caused on the specimen by the sequential scanning process, such as, e.g., charging effects built up on the specimen, physical impacts such as shrinkage, etc. For instance, a specific site on the specimen is repetitively scanned by an electron beam tool, such as SEM, in order to acquire a sequence of images. During the scanning, surface charge caused by the electron beam is continuously accumulated on the site which may cause scanning faults and image artifacts, such as, e.g., gross image distortion and/or image obliteration, etc. The repetitive scanning also physically affects the specimen, and one example of such impact is shrinkage (also referred to as carbonization effects). Such image artifacts and physical impacts can affect the measurement data of the images and lead to an increasing inability to accurately measure critical integrated device dimensions. For purpose of compensating such physical effects caused on the specimen, a specific image acquisition process can be used so as to reduce the interference with the evaluation of tool variations.

Figure 7:
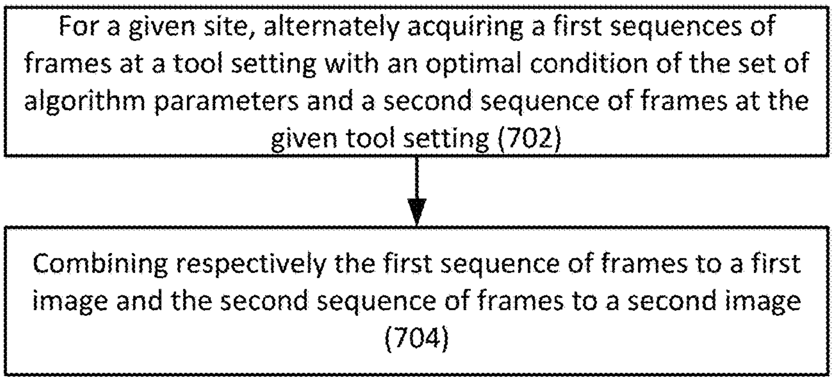
FIG. 7 illustrates a generalized flowchart of a specific image acquisition process for a given site in accordance with certain embodiments of the presently disclosed subject matter.

FIG. 7 illustrates a generalized flowchart of a specific image acquisition process for a given site in accordance with certain embodiments of the presently disclosed subject matter. Specifically, for a given tool setting of the plurality of tool settings as illustrated in 602, a set of images for a given site of the at least one site on the specimen can be acquired as follows: alternately acquiring (702) a first sequences of frames and a second sequence of frames, where the first sequences of frames are acquired at a tool setting with an optimal condition of the set of algorithm parameters, and the second sequences of frames are acquired at the given tool setting; and combining (704) respectively the first sequence of frames to a first image and the second sequence of frames to a second image. Therefore, for a given site, two images are obtained: the first image and the second image. For m selected sites on the specimen, the set of images acquired under the given tool setting comprises m*2 images.

Figure 8:
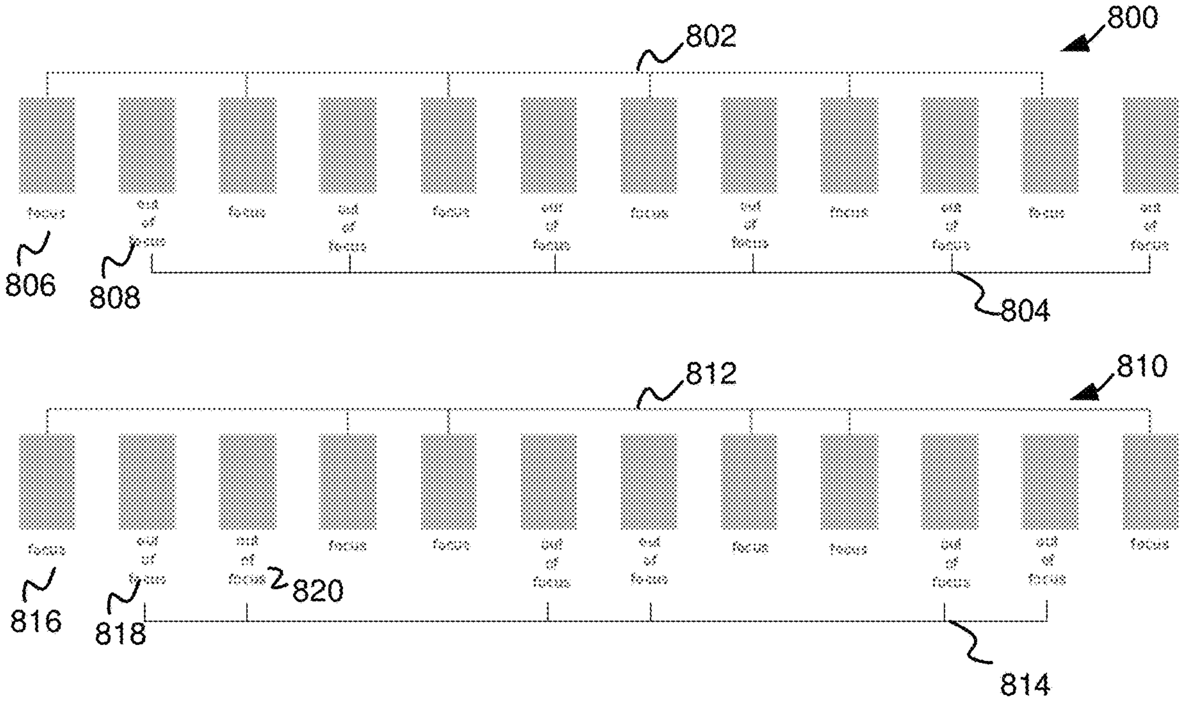
FIG. 8 illustrates an example of image acquisition of the first and second sequences of frames in accordance with certain embodiments of the presently disclosed subject matter.

FIG. 8 illustrates an example of image acquisition of the first and second sequences of frames in accordance with certain embodiments of the presently disclosed subject matter.

As shown, a sequence 800 of frames is acquired for a given site on the specimen. Assume a selected tool parameter in the set of tool parameters is focus. The sequence 800 of frames comprises a first sequence 802 acquired at an optimal focus condition, and a second sequence 804 acquired at an out-of-focus condition. The first sequence 802 and the second sequence 804 are acquired in an alternating manner. For instance, for the tool setting 604 as illustrated in FIG. 6 where the focus is shifted (out of focus) from the optimal focus, the tool is first configured with the optimal focus, and a focused frame 806 is acquired. Then the tool is configured with an out-of-focus condition, as defined by the x coordinate of tool setting 604, and a defocused frame 808 is acquired. Then the tool goes back to the optimal focus setting to acquire another focused frame. This process of focused and out-of-focus image acquisition (also referred to as A-B-A-B) repeats, until the entire sequence 800 of frames is acquired. The first sequence 802 is combined to form a first image, and the second sequence 804 is combined to form a second image. The above-described process can be repeated for each selected site on the specimen, giving rise to two images per site. In such ways, the physical effects, such as the carbonization effects, can be relatively evenly distributed between the first and second sequences of frames. The combined first and second images thus would result from a similar amount of such physical effects. When being evaluated one to the other with respect to matching, the similar amount of physical effects from the two images would be neutralized.

Alternatively, another sequence 810 of frames can be acquired in a slightly different manner. The sequence 810 of frames comprises a first sequence 812 acquired at an optimal focus condition, and a second sequence 814 acquired at an out-of-focus condition. The first sequence 812 and the second sequence 814 are acquired alternately, but in an A-B-B-A manner. For instance, the tool is first configured with the optimal focus, and a focused frame 816 is acquired. Then the tool is configured with an out-of-focus condition, as defined by the x coordinate of tool setting 604, and a defocused frame 818 is acquired. Next, the tool is not configured back with the optimal focus, such as illustrated in the sequence of 800. Rather, it continues with the configuration of the out-of-focus condition, and captures a third frame 820. It is then configured back to the optimal focus and captures the fourth frame, and so on and so forth, until the entire sequence 810 is acquired. Compared to the sequence 800, the sequence 810 supposedly further eliminates the variations of carbonization effects between the two sequences 812 and 814. The two combined images are thus less likely affected by such effects when being evaluated one to the other with respect to matching.

Although the above example illustrates alternating between an optimal condition and a non-optimal condition for one selected tool parameter, such methodology can be adapted to multiple tool parameters. For instance, in cases where the selected parameters include focus and NA, such as illustrated in 602, the first sequence of frames can be acquired at an optimal condition of the two parameters, and the second sequence of frames is acquired at a non-optimal condition of the two parameters, as defined by each given tool setting in 602 (such as the tool setting 604 where the values of the two parameters are defined by specific x and y coordinates).

It is to be noted although for purpose of illustration, 602 in FIG. 6 exemplifies combinations between two tool parameters, in some cases the set of tool parameters as selected can comprise more than two parameters. In such cases, the tool parameter space of 602 can be represented in a multi-dimensional parameter space, where each specific tool setting is characterized by the values of multiple tool parameters. For instance, in cases where the set of tool parameters includes three parameters: focus, NA and stigmatism, 602 can be represented as a three-dimensional (3D) parameter space where the x, y and z axis respectively represent one of the three parameters. Each dot in the 3D parameter space is characterized/defined by the three parameter values of the three axes.

Once the dataset is acquired, the metrology algorithm can be optimized (210) (e.g., by the recipe optimizer 106 in FIG. 1) using the plurality of sets of images, so as to meet at least a metrology metric including tool matching. As described above, a metrology algorithm can be regarded as part of a metrology recipe usable by a metrology tool to perform metrology operations on the specimen. A metrology algorithm typically pertains to a specific metrology application. A metrology application refers to what a customer/user is interested to measure in general with respect to the specimen. By way of non-limiting example, a metrology application can be one of the following: Critical Dimension (CD) metrology, Overlay (OVL), Measurement-Based Inspection (MBI), and Critical Dimension Uniformity (CDU), etc.

As the dataset acquired represents expected tool variations over time in a single tool or between different tools, it can be used to evaluate the metrology metric of matching, and optimize the metrology algorithm with respect to at least matching. Matching represents measurement variance between different tools (or of one tool over time), therefore is also referred to as tool matching, or tool-to-tool matching. Matching is related to the repeatability of measurement data from different images of the same given feature acquired by different tools. In some embodiments, the at least one metrology metric can further comprise one or more additional metrics, such as, e.g., precision, correlation, and sensitivity, as will be described below.

Figure 3:
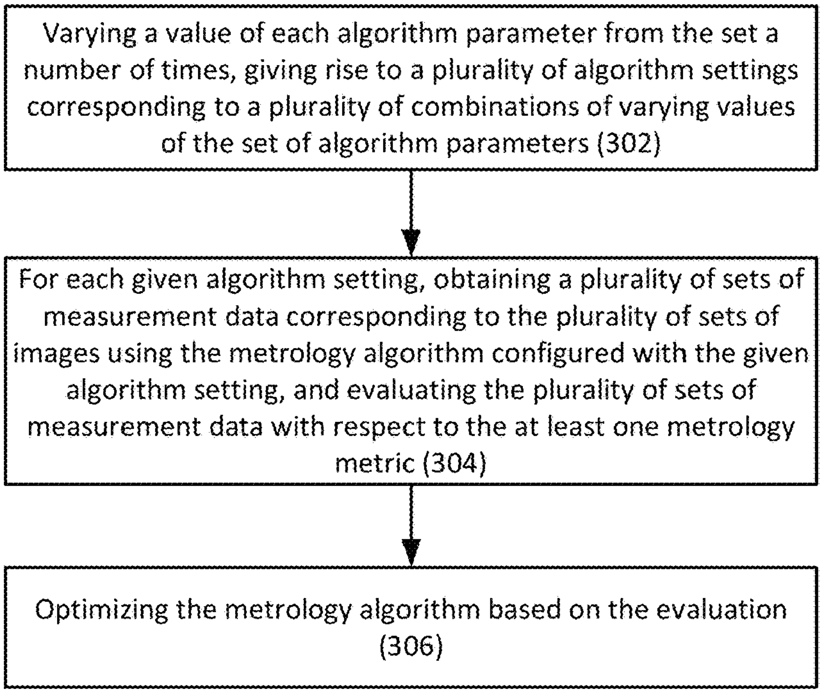
FIG. 3 illustrates a generalized flowchart of an exemplary process for optimizing a metrology algorithm in accordance with certain embodiments of the presently disclosed subject matter.

Various optimization methods can be used for tuning the algorithm parameters. FIG. 3 illustrates a generalized flowchart of an exemplary process for optimizing a metrology algorithm in accordance with certain embodiments of the presently disclosed subject matter.

As described above, a metrology algorithm typically comprises a large group of algorithm parameters characterizing the metrology algorithm. In some embodiments, the metrology algorithm can be optimized with respect to a set of algorithm parameters selected from the group of multiple algorithm parameters. By way of example, the set of algorithm parameters can be selected based on known knowledge. For instance, the selected set of algorithm parameters can include general parameters such as, e.g., smoothing, derivative (e.g., size and type of the derivative), etc., and/or many other custom-made algorithm parameters which pertain to a particular algorithm. Smoothing generally represents a low pass filter to be applied to the images. Derivative (e.g., size and type thereof) represents a high pass filter to be applied to the images.

The value of each algorithm parameter from the selected set can be varied (302) a number of times, giving rise to a plurality of algorithm settings corresponding to a plurality of combinations of varying values of the set of algorithm parameters. By way of example, the value of a given parameter can be varied within a predefined range in accordance with an interval.

For each given algorithm setting of the plurality of algorithm settings, a plurality of sets of measurement data corresponding to the plurality of sets of images can be obtained (304) using the metrology algorithm configured with the given algorithm setting. The plurality of sets of measurement data can be evaluated with respect to the at least one metrology metric. Once the plurality of algorithm settings have been all traversed, and the respective sets of measurement data obtained thereof are evaluated, the metrology algorithm can be optimized (306) based on the evaluation.

Figure 4:
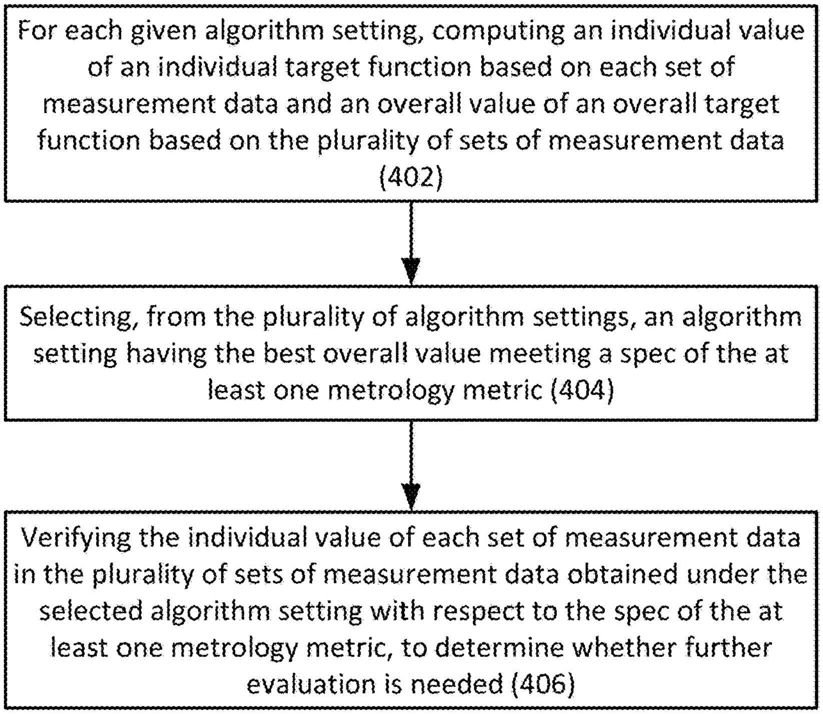
FIG. 4 illustrates a generalized flowchart of an exemplary process for evaluating the measurement data with respect to the at least one metrology metric in accordance with certain embodiments of the presently disclosed subject matter.

FIG. 4 illustrates a generalized flowchart of an exemplary process for evaluating the measurement data with respect to the at least one metrology metric in accordance with certain embodiments of the presently disclosed subject matter.

The measurement data can be evaluated using a target function (also referred to as a loss function) directed to at least one metrology metric. The target function used herein can refer to an individual target function for evaluating each individual set of measurement data for a specific tool setting, and an overall target function for evaluating the overall performance of the plurality of sets of measurement data.

Specifically, for each given algorithm setting, an individual value of the individual target function can be computed (402) based on each set of measurement data (e.g., obtained from a corresponding set of images of a respective tool setting). An overall value of the overall target function can be computed based on the plurality of sets of measurement data (e.g., corresponding to the plurality of sets of images of the plurality of tool settings). An algorithm setting that has the best overall value from the plurality of algorithm settings can be selected (404). In cases where the best overall value meets the spec of the at least metrology metric, such as, e.g., the spec for matching, the individual values of the plurality of sets of measurement data obtained under the selected algorithm setting can be verified (406) with respect to the spec, so as to determine whether further evaluation is needed.

Figure 5:
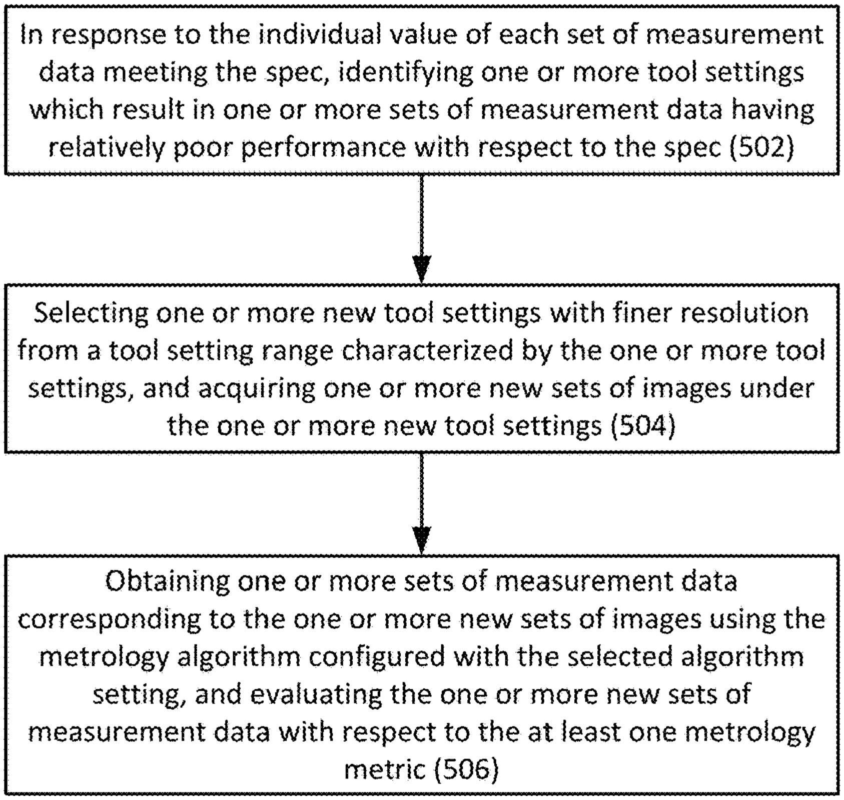
FIG. 5 shows a generalized flowchart of an exemplary verification process for verifying the individual values of the plurality of sets of measurement data obtained under the selected algorithm setting with respect to the spec in accordance with certain embodiments of the presently disclosed subject matter.

FIG. 5 illustrates a generalized flowchart of an exemplary verification process as described in block 406 in accordance with certain embodiments of the presently disclosed subject matter.

In response to the individual value of each set of measurement data meeting the spec, optionally, one or more tool settings (in the plurality of tool settings) which result in one or more sets of measurement data having relatively poor performance with respect to the spec, can be identified (502). One or more new tool settings can be selected (504) with finer resolution from a tool setting range characterized by the one or more tool settings, and one or more new sets of images can be acquired under the one or more new tool settings. Similarly, as described above with respect to block 304, one or more sets of measurement data corresponding to the one or more new sets of images can be obtained (506) using the metrology algorithm configured with the selected algorithm setting, and the one or more new sets of measurement data can be evaluated with respect to the at least one metrology metric.

By way of example, if all the new sets of measurement data also meet the spec of the at least one metrology metric, the metrology algorithm can be optimized using the selected algorithm setting. In cases where at least some of the new sets of measurement data do not meet the spec of the at least one metrology metric (or in cases where at least some of the plurality of sets of measurement data described above with reference to 406 do not meeting the spec), one or more new algorithm parameters can be selected from the multiple algorithm parameters and added to the set of algorithm parameters (e.g., in addition to the previously existing algorithm parameters in the set, or in lieu of some of them). In cases where the spec still cannot be met after adjusting new algorithm parameters, measures can be taken to consider tightening tolerance of tool parameter variations.

Continuing with the example of FIG. 6, 606 illustrates an algorithm parameter space characterized by two selected tool parameters: smoothing and derivative, respectively illustrated in the x and y directions. The values of the two parameters are respectively varied a number of times, giving rise to a plurality of combinations of varying values of the two parameters, represented by the dots in 606. Each dot represents a specific algorithm setting configured by corresponding smoothing and derivative values.

As described above, upon data collection as described with reference to FIG. 2, a dataset comprising a plurality of sets of images corresponding to the plurality of tool settings in 602 is obtained and can be used to optimize the metrology algorithm.

Specifically, for each algorithm setting specified in 606, the metrology algorithm can be configured with the specific algorithm setting, and a plurality of sets of measurement data can be obtained using the metrology algorithm configured as such, corresponding to the plurality of sets of images. The plurality of sets of measurement data can be evaluated with respect to the at least one metrology metric, using the individual target function and overall target function, as described above.

Take matching as an example of the at least one metrology metric. Assume the algorithm setting 608, upon being evaluated, has the best overall loss (i.e., the overall value of the overall target function) from the plurality of algorithm settings. The overall value also meets the spec of matching. In such cases, the individual loss for each set of measurement data in the plurality of sets of measurement data obtained under the algorithm setting 608 needs to be verified to make sure that the individual measurements resulting from all tool variations can all meet the spec, in addition to the overall loss which represents an averaged amount of tool variation.

Assume that, upon verification, it is identified that the tool settings within the range 610, although still meeting the spec, have relatively poor matching performance with respect to the rest of tool settings in 602. In such cases, optionally, one or more new tool settings can be selected from the range 610 with finer resolution. As illustrated, the range 610 has been fine sampled and five new tool settings 612 (represented by larger dots as compared to the original tool settings) are selected within the range, in proximity to the original tool settings. Five new sets of images are acquired under the five new tool settings 612.

Accordingly, five new sets of measurement data corresponding to the five new sets of images are obtained using the metrology algorithm configured with the algorithm setting 608. The five new sets of measurement data are then evaluated for matching. In cases where all the five new sets of measurement data also meet the spec of matching, the metrology algorithm can be optimized using the selected algorithm setting 608 which provides the best overall loss, while the individual losses thereof, even with finer sampling, also all meet the matching spec.

In cases where at least some of the five new sets of measurement data do not meet the spec of matching, or even at an earlier stage, where at least some individual losses of the plurality of sets of measurement data do not meet the spec, it indicates that the algorithm parameter model with the two selected parameters is not complex enough to be tuned to meet the spec. In such cases, one or more new algorithm parameters can be selected from the multiple algorithm parameters characterizing the algorithm. For instance, an outlier-removal-strength parameter can be selected and added to the set of algorithm parameters (e.g., in addition to the smoothing and derivative size). In such cases, the algorithm parameter space 606 turns into a three-dimensional parameter space, and measurement data can be obtained and evaluated under the new algorithm settings.

In cases where, after adding/replacing one or more new algorithm parameters and optimizing the algorithm, the matching spec still cannot be met, this indicates that the metrology algorithm simply cannot meet the matching spec under such a range of tool variations. In such cases, tolerance of tool parameter variations should be tightened or restricted. For instance, tool engineers can be updated that the values of the focus and NA parameters should be restricted to a limited range (e.g., avoiding the range in the tool parameter space that may cause out of spec) thus ensuring the spec to be met. This can be done, e.g., by more frequent maintenance and calibration, etc. On the other hand, if the algorithm performs well under a specific tool variation, the spec range can be increased accordingly, indicating that less calibration will be required on that specific variation, resulting in less maintenance time.

As described above, matching represents measurement variance between different tools (or of one tool over time), therefore is also referred to as tool matching, or tool-to-tool matching. Matching is related to the repeatability of measurement data from different images of the same given feature acquired by different tools. In order to evaluate matching, a dataset representing tool-to-tool variance, such as, e.g., the plurality of sets of images as described above, are collected during the data collection stage (as described above with reference to FIG. 2).

A loss function for evaluating the criterion of matching can be configured, e.g., by calculating a difference between the measurement data of different images acquired under different tool variations based on a matching measure.

By way of example, in the data collection scheme as illustrated in FIG. 8, where two images are collected for each site representative of tool variance between two tools, two subsets A and B are obtained, each containing a respective image of the two images of each site. The individual target function can be configured to represent a difference metric for evaluating the differences between the corresponding measurements from the two subsets. In some cases, the difference metric can be distance-based. Examples of such a difference metric can include, e.g., Lasso, Ridge regression, Lp-norm (p can be any integer), etc. The overall target function can be configured to represent a difference metric for evaluating the differences between the plurality of measurements corresponding to the plurality of tool settings.

In some embodiments, in addition to matching, the at least one metrology metric can further comprise one or more additional metrics, such as, e.g., precision, correlation and sensitivity, as will be described below.

Specifically, precision refers to the closeness of agreement between independent measurements (by the same metrology tool) on the same feature of the same area/site of a specimen. By way of example, high precision indicates that the independent measurements of the same feature are repeatable (i.e., the measurements have small variance with one another and the measurement distribution is relatively close). In some embodiments, precision can be regarded as measurement repeatability. In some other embodiments, precision can comprise two components: repeatability and reproducibility. Repeatability refers to a measure of measurement result distribution, where consecutive measurements are conducted repeatedly on the same site of the specimen, without any operator intervention. The cause for variation within repeated measurements results can be mainly due to the statistical nature of the tool signal (e.g., SEM signal), and the interpretation of the new set of signals by the measurement algorithm as comprised in the recipe. Reproducibility refers to another measure of measurement result distribution, where the measurements are obtained from different sites of the same specimen at different times. It accounts for the other sources of variation between independent measurements: wafer alignment, SEM autofocus, pattern recognition, tool stability etc.

For purpose of evaluating the algorithm performance with respect to precision, a precision dataset can be collected by acquiring images for a given feature (e.g., a structural feature from a given site of the specimen, or the same type of features from different areas/sites of the specimen) on the specimen by one metrology tool. The target function can be configured to represent the variance between the measurement data of different images acquired for the given feature.

By way of example, a target function configured to evaluate precision can be exemplified as follows:

$$L_{precision} = \text{difference metric}\left(y_1, y_2, \ldots\ y_n\left(y^t_{pred(A)}, y^t_{pred(B)}\right)\right)$$

The $y_1$-$y_n$ represents the measurements for n specific runs of scanning a given site or multiple sites. Similarly, as described above, the difference metric can be, e.g., the variance or any Lp-norm (p can be any integer) on the distance of each run's measurements to the multiple runs' average measurements, etc.

Correlation refers to the relationship between measurement data obtained from the images and the respective ground truth measurement data associated therewith. A target function for evaluating the criterion of correlation can be configured to represent the discrepancy between the measurement data and the respective ground truth measurement data.

For purpose of evaluating correlation, ground truth measurement data need to be provided. By way of example, a target function configured to evaluate correlation can be exemplified as follows:

$$L_{correlation} = \text{difference metric}(y_{true}, y_{pred})$$

The $y_{pred}$ represents the measurements obtained from the images. The $y_{true}$ represents the ground truth measurement data, such as as provided by a reference metrology algorithm, or by the customer. The target function represents a difference metric for evaluating the differences between the measurements and the corresponding ground truth measurements.

Sensitivity refers to how sensitive the measurements are with respect to changes of sizes of the features of a specimen. By way of example, if the feature of the specimen (e.g., width of a structural element) changes from 10 nm to 10.1 nm, high sensitivity indicates that the corresponding measurement should be sensitive to such change of scales, and the measurement result should reflect such change. In cases where the dataset includes images with changing sizes of features (such as, e.g., synthesized training images simulated specifically with changing sizes of certain structural elements) and respective ground truth data thereof, sensitivity can be evaluated.

A target function for evaluating the criterion of sensitivity can be configured, e.g., by estimating a linear regression function between the plurality of measurement data and the associated ground truth data. By way of example, the linear regression can be estimated as, e.g., the measurement data=gain*ground truth+offset.

In some cases, the metrology algorithm can be optimized to meet a specific metrology metric using a target function directed to the specific metric. In some other cases, the metrology algorithm can be optimized to meet multiple metrology metrics, such as, e.g., matching, precision, sensitivity, and correlation. In such cases, a total target/loss function can comprise various components of specific target functions configured for specific metrics, where respective weights can be applied for the specific target functions. For instance, the total target function can be represented as follows:

$$L_{total} = a_1 L_{correlation} + a_2 L_{matching} a_3 L_{precision} L_{total} = a_1 L_{precision} + a_2 L_{matching} + a_3 L_{correlation} + a_4 L_{sensitivity}$$

The metrology algorithm, once optimized using the total target function configured with the above components, can be used in runtime for processing input images from any tool and providing runtime measurements with optimized tool-to-tool variance, while at the same time meeting the correlation, sensitivity, and precision requirements.

In some cases, optionally, one or more additional target/loss functions can be added in the total loss function, in addition to or in lieu of the above exemplified components, and the present disclosure is not limited to the specific representation and/or the number of components included in the total cost function.

In some embodiments, the criteria for the one or more metrology metrics can be predetermined in accordance with the customer's specification and/or based on previous examination experience.

It is to be noted that the metrology algorithm used herein can refer to any kind of algorithms usable for performing metrology operations for a metrology application, such as, e.g., the conventional metrology algorithm, and/or machine learning (ML) based algorithm. In cases where the metrology algorithm is ML based and comprises a ML model, optimization of the algorithm can be regarded as part of the training process of the ML model. The ML model can be optimized until a loss function (i.e., target function) meets a predefined criterion. In some cases, the loss function refers to a total loss function which may comprise one or more loss functions specifically configured to evaluate one or more metrology metrics, including matching.

By way of example, the weighting and/or threshold values of the ML model can be initially selected prior to training, and can be further iteratively adjusted or modified during training to achieve an optimal set of weighting and/or threshold values in a trained ML model. After each iteration, depending on a specific loss function, a difference can be determined between the actual output produced by the ML model and the target output associated with the respective training data. Such a difference can be referred to as an error value. Training can be determined to be complete when one or more loss functions, indicative of one or more error values, are less than respective predetermined values, or when a limited change in performance between iterations is achieved (which can be predefined).

It is to be noted that examples illustrated in the present disclosure, such as, e.g., the exemplified metrology applications, the exemplified metrology metrics, the optimization process, and the image acquisition process, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein, is providing an automatic metrology recipe setup and optimization process, which results in a metrology recipe/algorithm that provides measurement data meeting the spec of one or more metrology metrics such as, e.g., precision, matching, sensitivity, and/or correlation, and the tradeoffs therebetween, thus providing optimal algorithm performance. Such optimization is fully automatic, and does not depend on user experience and proficiency.

Among further advantages of certain embodiments of the presently disclosed subject matter, as described herein, is a data generation process capable of acquiring, from a single tool, a dataset representative of expected tool variations between different tools or over time on a single tool, which avoids the necessity of placing a full fleet of tools offline, thus significantly improving system throughput.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the present discussions, it is appreciated that throughout the specification discussions utilizing terms such as "obtaining", "examining", "varying", "configuring", "acquiring", "optimizing", "using", "selecting", "evaluating", "computing", "verifying", "meeting", "tightening", "identifying", "combining", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the metrology system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized metrology system, the system comprising an examination tool operatively connected to a processing circuitry, wherein:

the processing circuitry is configured to:

obtain a set of tool parameters selected from multiple tool parameters characterizing the examination tool, vary a value of each tool parameter from the set a number of times, giving rise to a plurality of tool settings corresponding to a plurality of combinations of varying values of the set of tool parameters, and configure the examination tool with each given tool setting of the plurality of tool settings; and the examination tool is configured to:

in response to being configured with each given tool setting, acquire a set of images capturing at least one site on a specimen with the given tool setting, thereby obtaining a plurality of sets of images corresponding to the plurality of tool settings and representing expected tool variations over time in a single tool or between different tools;

wherein the processing circuitry is further configured to optimize a metrology algorithm using the plurality of sets of images so as to meet at least one metrology metric including tool matching.

2. The computerized metrology system according to claim 1, wherein the metrology algorithm is optimized with respect to a set of algorithm parameters selected from multiple algorithm parameters characterizing the metrology algorithm.

3. The computerized metrology system according to claim 2, wherein the processing circuitry is further configured to optimize the metrology algorithm by:

varying a value of each algorithm parameter from the set a number of times, giving rise to a plurality of algorithm settings corresponding to a plurality of combinations of varying values of the set of algorithm parameters;

for each given algorithm setting, obtaining a plurality of sets of measurement data corresponding to the plurality of sets of images using the metrology algorithm configured with the given algorithm setting, and evaluating the plurality of sets of measurement data with respect to the at least one metrology metric; and optimizing the metrology algorithm based on the evaluation.

4. The computerized metrology system according to claim 3, wherein the evaluating comprises:

for each given algorithm setting, computing an individual value of an individual target function based on each set of measurement data and an overall value of an overall target function based on the plurality of sets of measurement data;

selecting, from the plurality of algorithm settings, an algorithm setting having the best overall value meeting a spec of the at least one metrology metric; and verifying the individual value of each set of measurement data in the plurality of sets of measurement data obtained under the selected algorithm setting with respect to the spec of the at least one metrology metric, to determine whether further evaluation is needed.

5. The computerized metrology system according to claim 4, wherein the verifying comprises:

in response to the individual value of each set of measurement data meeting the spec, identifying one or more tool settings which result in one or more sets of measurement data having relatively poor performance with respect to the spec;

selecting one or more new tool settings with finer resolution from a tool setting range characterized by the one or more tool settings, and acquiring one or more new sets of images under the one or more new tool settings; and obtaining one or more sets of measurement data corresponding to the one or more new sets of images using the metrology algorithm configured with the selected algorithm setting, and evaluating the one or more new sets of measurement data with respect to the at least one metrology metric.

6. The computerized metrology system according to claim 4, wherein the verifying comprises, in response to at least some of the plurality of sets of measurement data having an individual value not meeting the spec, selecting one or more new algorithm parameters to add to the set of algorithm parameters, or tightening tolerance of tool parameter variations.

7. The computerized metrology system according to claim 1, wherein the processing circuitry is configured to acquire the set of images for each given tool setting by:

for a given site of the at least one site, alternately acquiring a first sequence of frames and a second sequence of frames, wherein the first sequence of frames is acquired at a tool setting with an optimal condition of a set of algorithm parameters, and the second sequence of frames is acquired at the given tool setting; and combining respectively the first sequence of frames to a first image and the second sequence of frames to a second image, wherein the set of images comprises the first image and the second image for the given site.

8. The computerized metrology system according to claim 1, wherein the at least one metrology metric further comprises one or more of precision, correlation, and sensitivity.

9. The computerized metrology system according to claim 1, wherein the set of tool parameters comprises focus, stigmatism, and numerical apertures.

10. The computerized metrology system according to claim 2, wherein the set of algorithm parameters comprise smoothing and derivative.

11. A computerized metrology method, the method comprising:

obtaining a set of tool parameters selected from multiple tool parameters characterizing the examination tool;

varying a value of each tool parameter from the set a number of times, giving rise to a plurality of tool settings corresponding to a plurality of combinations of varying values of the set of tool parameters;

configuring an examination tool with each given tool setting of the plurality of tool settings; and in response to receiving, from the examination tool, a plurality of sets of images corresponding to the plurality of tool settings and representing expected tool variations over time in a single tool or between different tools, optimizing a metrology algorithm using the plurality of sets of images so as to meet at least one metrology metric including tool matching.

12. The computerized metrology method according to claim 11, wherein the metrology algorithm is optimized with respect to a set of algorithm parameters selected from multiple algorithm parameters characterizing the metrology algorithm.

13. The computerized metrology method according to claim 12, wherein the optimizing comprises:

varying a value of each algorithm parameter from the set a number of times, giving rise to a plurality of algorithm settings corresponding to a plurality of combinations of varying values of the set of algorithm parameters;

for each given algorithm setting, obtaining a plurality of sets of measurement data corresponding to the plurality of sets of images using the metrology algorithm configured with the given algorithm setting, and evaluating the plurality of sets of measurement data with respect to the at least one metrology metric; and optimizing the metrology algorithm based on the evaluation.

14. The computerized metrology method according to claim 13, wherein the evaluating comprises:

for each given algorithm setting, computing an individual value of an individual target function based on each set of measurement data and an overall value of an overall target function based on the plurality of sets of measurement data;

selecting, from the plurality of algorithm settings, an algorithm setting having the best overall value meeting a spec of the at least one metrology metric; and verifying the individual value of each set of measurement data in the plurality of sets of measurement data obtained under the selected algorithm setting with respect to the spec of the at least one metrology metric, to determine whether further evaluation is needed.

15. The computerized metrology method according to claim 14, wherein the verifying comprises:

in response to the individual value of each set of measurement data meeting the spec, identifying one or more tool settings which result in one or more sets of measurement data having relatively poor performance with respect to the spec;

selecting one or more new tool settings with finer resolution from a tool setting range characterized by the one or more tool settings, and acquiring one or more new sets of images under the one or more new tool settings; and obtaining one or more sets of measurement data corresponding to the one or more new sets of images using the metrology algorithm configured with the selected algorithm setting, and evaluating the one or more new sets of measurement data with respect to the at least one metrology metric.

16. The computerized metrology method according to claim 14, wherein the verifying comprises, in response to at least some of the plurality of sets of measurement data having an individual value not meeting the spec, selecting one or more new algorithm parameters to add to the set of algorithm parameters, or tightening tolerance of tool parameter variations.

17. The computerized metrology method according to claim 11, further comprising acquiring a set of images for each given tool setting by:

for a given site of at least one site, alternately acquiring a first sequence of frames and a second sequence of frames, wherein the first sequence of frames is acquired at a tool setting with an optimal condition of a set of algorithm parameters, and the second sequence of frames is acquired at the given tool setting; and combining respectively the first sequence of frames to a first image and the second sequence of frames to a second image, wherein the set of images comprises the first image and the second image for the given site.

18. The computerized metrology method according to claim 11, wherein the at least one metrology metric further comprises one or more of precision, correlation, and sensitivity.

19. The computerized metrology method according to claim 11, wherein the set of tool parameters comprises focus, stigmatism, and numerical apertures.

20. A non-transitory computer readable storage medium tangibly embodying a program of instructions that, when executed by a computer, cause the computer to perform a metrology method, the method comprising:

obtaining a set of tool parameters selected from multiple tool parameters characterizing the examination tool;

varying a value of each tool parameter from the set a number of times, giving rise to a plurality of tool settings corresponding to a plurality of combinations of varying values of the set of tool parameters;

configuring an examination tool with each given tool setting of the plurality of tool settings; and in response to receiving, from the examination tool, a plurality of sets of images corresponding to the plurality of tool settings and representing expected tool variations over time in a single tool or between different tools, optimizing a metrology algorithm using the plurality of sets of images so as to meet at least one metrology metric including tool matching.

* * * * *